United States Patent [19]

Hasler et al.

[11] 4,105,823
[45] Aug. 8, 1978

[54] MICROCAPSULES, METHOD FOR THEIR PREPARATION, AND SHEET MATERIAL CARRYING MICROCAPSULES

[75] Inventors: David John Hasler, Caddington; Thomas Allan McGhee, St. Albans, both of England

[73] Assignee: Wiggins Teape Limited, England

[21] Appl. No.: 742,216

[22] Filed: Nov. 15, 1976

[30] Foreign Application Priority Data

Nov. 26, 1975 [GB] United Kingdom ............... 48616/75

[51] Int. Cl.$^2$ ........................ B32B 3/26; B01J 13/02
[52] U.S. Cl. .................................... 428/307; 252/316; 282/27.5; 424/32; 428/914
[58] Field of Search ........................ 252/316; 424/32; 260/67.6 R; 428/307, 914, 327

[56] References Cited

U.S. PATENT DOCUMENTS

| | | | |
|---|---|---|---|
| 2,473,463 | 6/1949 | Adams | 260/67.6 R |
| 3,137,631 | 6/1964 | Soloway | 252/316 X |
| 3,607,775 | 9/1971 | Yoshida et al. | 252/316 |
| 3,875,074 | 4/1975 | Vassiliades et al. | 252/316 |
| 4,001,140 | 1/1977 | Foris et al. | 252/316 |

Primary Examiner—Richard D. Lovering
Attorney, Agent, or Firm—Burns, Doane, Swecker & Mathis

[57] ABSTRACT

A method of encapsulating finely divided particulate material, such as minute droplets of a water-immiscible liquid, to produce microcapsules in which the particulate material is surrounded by polymeric shells, comprising the steps of forming a dispersion of the particulate material in an aqueous medium containing a water-soluble ureaformaldehyde precondensate, a water-soluble melamineformaldehyde precondensate and a water-soluble polymer which is capable of being cross-linked by said precondensates, and condensing said precondensates by acid catalysis with resultant cross-linking of the polymer about the particulate material so as to form the polymeric shells. The polymer may be a cellulose derivative, starch, a starch derivative, a polyacid, a polyester, a polyanhydride copolymer, a polyacrylamide or a polyacrylamide copolymer, and is preferably an acrylamide/acrylic acid copolymer.

23 Claims, 4 Drawing Figures

MICROCAPSULES, METHOD FOR THEIR PREPARATION, AND SHEET MATERIAL CARRYING MICROCAPSULES

This invention relates to microcapsules and their production.

Microcapsules afford a convenient means of holding reactive or volatile materials in readiness for subsequent use. The encapsulated materials retain their properties until the article to which they are applied is used. Amongst the materials which it has been proposed to encapsulate are flavourings, adhesives, sealants, drugs, fertilisers and dyes.

However, the most widespread use of microcapsules to date has probably been in certain kinds of pressure sensitive copying systems. In one such system, usually known as a transfer system, an upper sheet is coated on its lower surface with microcapsules containing a solution of colourless colour former, and a lower sheet is coated on its upper surface with a colour developing co-reactant material, e.g. an acidic clay, a phenolic resin or certain organic salts. For most applications, a number of intermediate sheets are also provided, each of which is coated on its lower surface with microcapsules and on its upper surface with acidic material. Pressure exerted on the sheets by writing or typing ruptures the microcapsules, thereby releasing the colour former solution on to the acidic material on the next lower sheet and giving rise to a chemical reaction which develops the colour of the colour former.

In another such system, usually known as a self-contained system, microcapsules and colour developing co-reactant material are coated on to the same surface of a sheet of paper, and writing or typing on a sheet placed above the coated sheet causes the capsules to rupture and release the colour former, which then reacts with the co-reactant material on the sheet to produce a colour.

Hitherto, the most commonly used method of making microcapsules has been by coacervation from an aqueous solution of hydrophilic colloids, such as gelatin, gum arabic, polyvinyl methyl ether/maleic anhydride copolymer and carboxymethyl cellulose. However coacervation techniques have a number of disadvantages. Firstly, encapsulation can only be carried out using an aqueous solution of low solids content, because coacervation only occurs at low colloid concentrations and because at high solids contents the vicosity of the system tends to become unworkably high. In consequence, encapsulation by coacervation techniques has been carried out typically in the past at from 18 to 23% solids content. Secondly, hydrophilic colloids tend to be expensive, particularly gelatin which is the material most commonly used. Thirdly, for optimum operation, the characteristics and purity of the colloids used are critical and have to be precisely specified. For example a high salt content must not be present as this would inhibit coacervation. Fourthly, since many of the hydrophilic colloids used are natural products or derivatives of natural products, they tend to be attacked by microorganisms. This limits the time for which the colloids can be stored, both as raw materials prior to coacervation and as finished capsules. Fifthly, the colloidal walls of capsules made by coacervation may not be completely impermeable, which may result in some cases in gradual leaching out of capsule contents. This may sometimes be so serious as to prevent the encapsulation of certain materials. Sixthly, the future availability at reasonable cost of natural materials such as gelatin and gum arabic has on occasions appeared uncertain.

Despite the disadvantages listed above, coacervation techniques have been widely and successfully used for encapsulating oily solutions of colourless colour formers for use in pressure sensitive copying papers. However, the use of in situ polymerisation techniques for making microcapsule walls could theoretically overcome many of the disadvantages of coacervation techniques. For example, higher wall material concentrations are theoretically usable because the problem of coacervation inhibition does not arise. Moreover aminoplast wall materials, which are inherently suited to in situ polymerisation techniques, are generally cheap compared with the hydrophilic colloids used hitherto. A further advantage is that they are likely to continue to be widely available and that their characteristics need not be specified to precisely as that of hydrophilic colloids for use in coacervation techniques. Synthetic wall materials are also generally less susceptible to attack by microorganisms, and capsules made from them are potentially less likely to allow leaching out of microcapsule contents than are microcapsules made using naturally occurring wall materials such as gelatin.

It is not surprising therefore that a number of proposals for it situ polymerisation techniques have been made. However, although capsules have been made on a commercial scale by an in situ polymerisation technique for a number of years now, coacervation techniques have remained dominant.

An early proposal for an in situ polymerisation technique is to be found in Example IV of U.S. Pat. No. 3,016,308. Liquid to be encapsulated is dispersed in an aqueous solution of a water soluble urea formaldehyde precondensate and further condensation and subsequent precipitation of urea formaldehyde resin is brought about by the addition of hydrochloric acid. A small amount of carboxymethyl cellulose is present, presumably as an emulsifying agent.

Another technique using area and formaldehyde (or a urea formaldehyde pre-polymer) is described in U.S. Pat. Nos. 3,516,846 and 3,516,941. These stress the importance of careful control of the acidification step is capsules having acceptable properties are to be obtained. These patents also assert that a wetting agent such as carboxymethyl cellulose is incompatible with the formation of useful capsules.

All three U.S. patents mentioned above stress the importance of rapidly agitating the dispersion during the condensation reaction. If this is not done, the dispersion de-stabilizes, i.e. the droplets coalesce. This tendency for coalescence to occur makes it very difficult to control droplet size (and hence microcapsule size) and also prevents very small microcapsules being produced other than in very tiny amounts. Reproducible control of droplet size is very important in achieving a pressure sensitive copying paper of reproducible copying capability. Moreover the need to maintain the dispersion in existence by rapid agitation consumes large amounts of energy and hence adds to production costs.

Proposals for overcoming the problems of poor dispersion stability have been made in British Pat. Nos. 1,156,725, 1,301,052, and 1,355,124, all of which disclose the use of reactive surface active agents or "tensides". These are polymer precursors, for example aminoplast precursors, which are chemically modified so as to be surface active. They thus offer the potential of forming a more stable dispersion of droplets to be encapsulated. The chemical modification would however appear to increase the cost of the precursors compared with the unmodified materials. So far as we are aware, capsules made using reactive surface active agents as described in British Pat. Nos. 1,156,725, 1,301,052 and 1,355,124 have not been used on a commercial scale.

A different approach to making capsules having walls of formaldehyde condensation products involves the use of aqueous thermosetting resins which on dilution with water have the property of separating out of solution to form a polymeric phase. Such a dilution step must limit the solids content at which microcapsules can be prepared. Moreover, since dilution is emphasised as being the final process operation, it is not clear to what extent the resins will "set" to form impermeable capsule walls, particularly since the process does not apparently involve the use of a hardening agent or of pH adjustment. It also seems likely that adequate stirring of the dispersion before addition of the dilution water will be difficult, in view of the likely high viscosity of a "resin syrup".

Yet another approach to the production of synthetic walled microcapsules has been by so-called "interfacial polymerisation" techniques. These involve two reactive polymer precursors, one of which is present in droplets of the material to be encapsulated and the other of which is present in the medium in which the droplets are dispersed. The precursors then react at the interfaces between the droplets and the medium to form the microcapsule walls. A disadvantage of such a technique is that once a very thin "skin" has formed at the boundary of the droplet, the precursors are separated from one another and further reaction is inhibited. This means that it is difficult to form walls of adequate strength. Proposals have been made for overcoming this problem, but so far as we are aware, they have not been successful to an extent sufficient to displace the microcapsule manufacturing techniques hitherto used commercially.

It is an object of the present invention to provide a method of microcapsule production which obviates at least in part some of the disadvantages of the coacervation and other techniques described above.

According to the invention, there is provided a method of encapsulating finely divided particulate material to produce microcapsules in which the particulate material is surrounded by polymeric shells, comprising the steps of forming a dispersion of said particulate material in an aqueous medium containing a water soluble urea formaldehyde precondensate, a water soluble melamine-formaldehyde precondensate and a water soluble polymer which is capable of being cross-linked by said precondensates, and condensing said precondensates by acid catalysis with resultant cross-linking of said polymer about said particulate material, thereby to form said polymeric shells. It is thought that the cross-linking action of the precondensates is primarily the result of the presence of methylol groups, but other groupings may possibly be involved.

The invention also embraces microcapsules produced by the method defined in the preceding paragraph and sheet material carrying such microcapsules. Such sheet material may be paper, and the microcapsules may be present as a coating or in the interstices between the fibres of the paper.

The finely divided particulate material may be a solid or it may be minute droplets of a water-immiscible liquid. In the latter case, the polymer must be dispersion stabilising as defined hereafter.

The expression "water-immiscible liquid" includes not only liquids which are absolutely immiscible with water but also those which are largely immiscible with water but nevertheless have a slight solubility.

The water-soluble polymer preferably contains alcohol, amine, amide, acid or acid derivative groups. Preferred examples of such polymers are cellulose derivatives e.g. carboxymethyl cellulose and methylhydroxy propyl cellulose gelatin, starch, a starch derivative, a polyacid, a polyester, a polyanhydride copolymer e.g. polyvinyl methyl ether/maleic anhydride copolymer or polyethylene maleic/anhydride copolymer, a polyacrylamide or an acrylamide copolymer. A particularly advantageous polymer is an acrylamide/acrylic acid copolymer. Capsules made using such a copolymer have been found to be particularly resistant to ageing.

By a dispersion-stabilising polymer is meant a polymer which in solution is dispersion stabilising on its own, or if that is not the case, is dispersion stabilising in the presence of at least one of the precondensates. An example of the latter type of polymer is the preferred acrylamide/acrylic acid copolymer, which is not dispersion stabilising on its own, but when mixed with the urea formaldehyde precondensate will stabilise a dispersion. In order that the polymer is dispersion-stabilising, the polymer is desirably charged, and is preferably anionic.

Whilst in principle the chemical characteristics of the precondensates are not critical, there are certain practical constraints on the particular materials to be used. Firstly, the precondensates must be soluble in water. Secondly, some precondensates prevent the formation of a stable dispersion of the droplets, even in the presence of the dispersion-stabilising polymer. The choice of suitable precondensates which avoid the problems just discussed does not present any difficulty to the experienced encapsulation technologist.

The urea formaldehyde precondensate is preferably cationic, and the melamine formaldehyde precondensate is preferably a methylated melamine formaldehyde precondensate. Instead of a single melamine formaldehyde precondensate, a mixture of two or more such materials may be used. Similarly, a mixture of two or more urea formaldehyde precondensates may be used.

If only polymer and urea formaldehyde precondensate are used, i.e. no melamine formaldehyde is present, capsules can still be formed, but they tend to be too weak to withstand the drying operations involved in paper coating. Even if they can withstand such operations, it has been found that they weaken unacceptably on ageing.

The present method may be carried out in a number of ways. For example, the urea formaldehyde precondensate, the melamine formaldehyde precondensate and the water-soluble polymer may all be present in the aqueous medium before addition of the liquid to be encapsulated, and the acid for bringing about condensation of the precondensates may be added subsequently. Alternatively however, only the urea formaldehyde precondensate and the water-soluble polymer may be present in the aqueous medium when the liquid to be encapsulated is added. The melamine formaldehyde precondensate is then added subsequently.

The stage at which acid is added is not crucial. It is preferred that the acid is added once the material to be encapsulated has been added, either before or after addition of the melamine formaldehyde precondensate. It is of course important that excessive condensation of the precondensates does not occur before the droplets are added, and that excessive condensation of the urea formaldehyde precondensate does not occur before addition of the melamine formaldehyde precondensate, if the latter is added after the acid. Conditions under which such excessive condensation is avoided, are readily determined by experiment.

The optimum pH for the condensation and cross-linking reactions depends to some extent on the precondensates and the water-soluble polymer used. For example, for the preferred acrylamide/acrylic acid copolymer a pH in the range 3.5 to 5.0 is preferred, more preferably 4.0 to 4.5, for example 4.15. However, for a different polymer, vinyl methyl ether/maleic anhydride copolymer, a pH of 5.0 to 5.5 is preferred. The acid used for pH adjustment is not critical, and may for example be acetic acid or hydrochloric acid. If the water soluble polymer has a high natural acidity, the amount of acid used for pH adjustment will be less, and could possibly be zero. An example of a polymer having a high natural acidity is ethylene/maleic anhydride copolymer.

The order in which the capsule wall materials are added influences capsule production. At least certain melamine formaldehyde precondensates tend to destabilise a dispersion of material to be encapsulated, which leads to coalescence of small droplets to form larger droplets. Thus, if the melamine formaldehyde addition is delayed until some time after acidification, less coalescence occurs. The coalescence-inducing effect of melamine formaldehyde precondensate affords a degree of control over the droplet size of the capsules. For example, it is possible to add the melamine formaldehyde precondensate in small batches over a period of time, for example one hour. The more the number of separate additions, the greater the degree of coalescence observed.

For minimising coalescence, the dispersion may be chilled before addition of the melamine formaldehyde precondensate and before addition of acid for bringing about condensation. Chilling is preferably to below 20°, for example to 15° C. Chilling to any temperature below 30° C has however been found to have some effect.

Acidification may be followed by maintaining the mixture in a warm state, for example at 55° C for 2 hours. If the melamine formaldehyde precondensate is added after addition of the material to be encapsulated, without a chilling step, it is preferred to adjust the pH of the dispersion before addition of the melamine formaldehyde precondensate and then to maintain the dispersion at 55° C for 2 hours after the addition of the melamine formaldehyde precondensate. Adjustment may be in two stages, one before and the other after addition of melamine formaldehyde precondensate.

If a temperature lower than 55° C is used, capsules can still be obtained, but their production takes longer. For example, if the mix is maintained at 35° rather than 55° C, the time taken to produce equivalent capsules may be as much as fifteen hours. Temperatures greater than 55° may be used, for example up to 85° C, but such capsules have so far been found to be somewhat more susceptible to premature rupture once they are coated on to a paper sheet.

After condensation and cross-linking of the wall materials has occurred, the pH of the dispersion may be raised to alkalinity to stop further reaction of the wall materials.

The capsule size is determined, within limits, by the size of the droplets being encapsulated, and thus the capsule size can be varied by suitably milling a mixture of the capsule contents and a solution of one or more of the capsule wall materials.

The present method may produce single oil drop capsules or capsule clusters, depending to a considerable extent on the materials and conditions used. For example, whereas the preferred acrylamide/acrylic acid copolymer gave predominantly single oil drop capsules, use of polyvinyl methyl ether/maleic anhydride copolymer instead gave predominantly capsule clusters. Both single oil drop capsules and capsule clusters are well known in the microencapsulation art, and so will not be described further herein.

The extent to which the dispersion of materials to be encapsulated is stirred also influences the type of capsule produced. In general, increased stirring results in production of a higher proportion of single oil droplet capsules.

The relative proportions of the precondensates and the polymer can be varied quite considerably whilst still obtaining capsules, although functional properties of the capsules are affected. An Example illustrating the use of different relative proportions of the precondensates and the polymer is described subsequently.

The phase ratio employed is generally around 6:1 if capsules for a transfer pressure sensitive system are required, but this is not critical (the phase ratio is the weight ratio of oil droplets to capsule wall material in the aqueous solution). A higher phase ratio may be used if it is desired to encapsulate at a higher solids content. If it is desired to produce stronger capsules, for example for use in a self-contained pressure-sensitive copying system, for which the capsules should be more robust, a lower phase ratio should be used.

The present method has so far been found to produce capsules at solids contents of at least 50% if the most preferred water-soluble polymers and the most preferred precondensates are used.

It will be realised from the foregoing that the present invention involves a number of variables, both in the wall materials used and the choice of process parameters, i.e. the experimental conditions and the sequence in which the various process steps are carried out. For any particular combination of wall materials therefore, it is necessary to experiment to find the optimum way of practising the invention so as to obtain capsules having good properties. This experimentation is in the nature of acquiring expertise and know-how and will present little difficulty to the skilled encapsulation technologist.

In order to illustrate the production of microcapsules by the present method, reference will now be made to FIGS. 1, 2, and 3 of the accompanying drawings which illustrate diagrammatically and by way of example three embodiments thereof, and in which.

Figure 1:
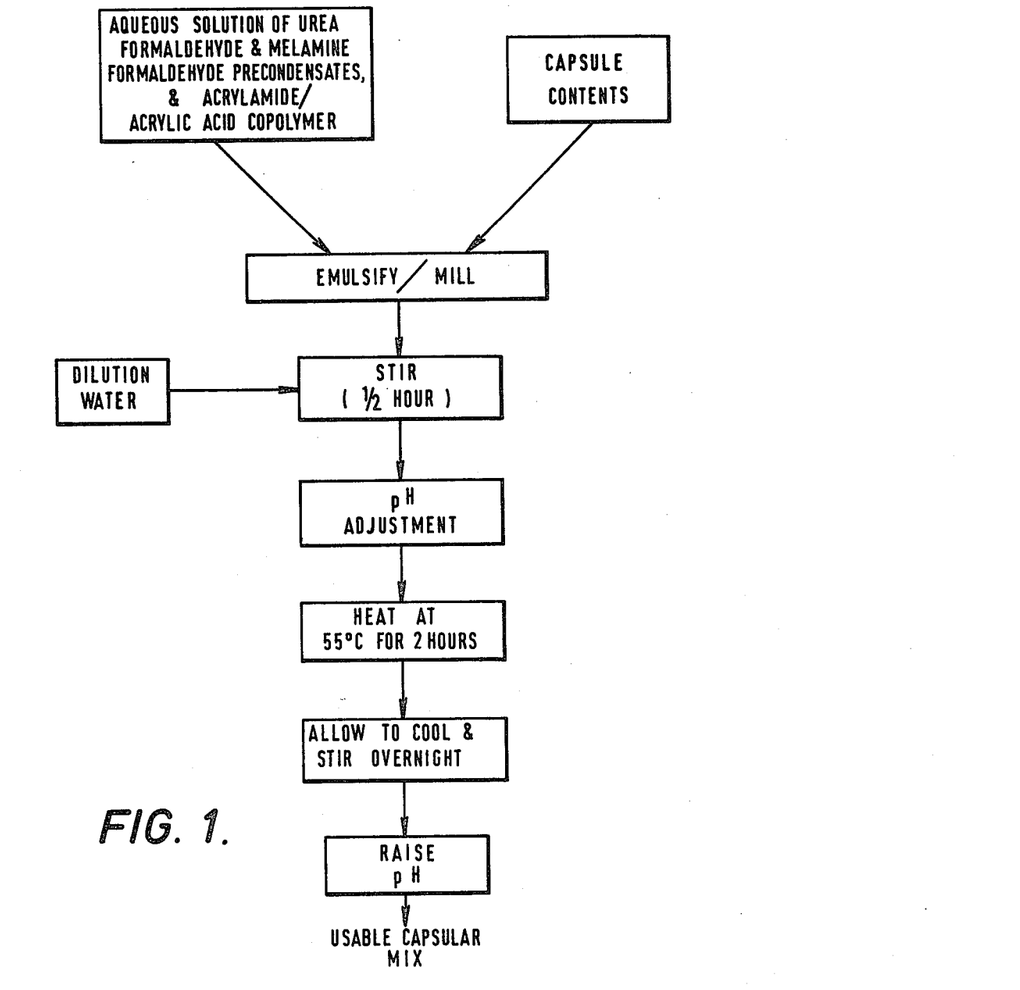
FIG. 1 depicts a process in which liquid to be encapsulated is added to an unacidified solution of urea formaldehyde precondensate, melamine formaldehyde precondensate and acrylamide/acrylic acid copolymer.

Referring first to FIG. 1, an aqueous solution of urea formaldehyde precondensate, melamine formaldehyde precondensate and acrylamide/acrylic acid copolymer is first prepared and then milled with material to be encapsulated until a desired droplet size is achieved, for example 2 to 3 μm. The dispersion is then diluted with more water and stirred for a period of, for example, half an hour. The dispersion is then acidified with acetic acid to a pH of about 4.7, raised to a temperature of about 55° C and maintained at that temperature for about 2 hours. The dispersion is then allowed to cool and is left stirring overnight, after which usable capsules are found to be present. The pH was then raised to about 8.5 with sodium hydroxide solution.

Figure 2:
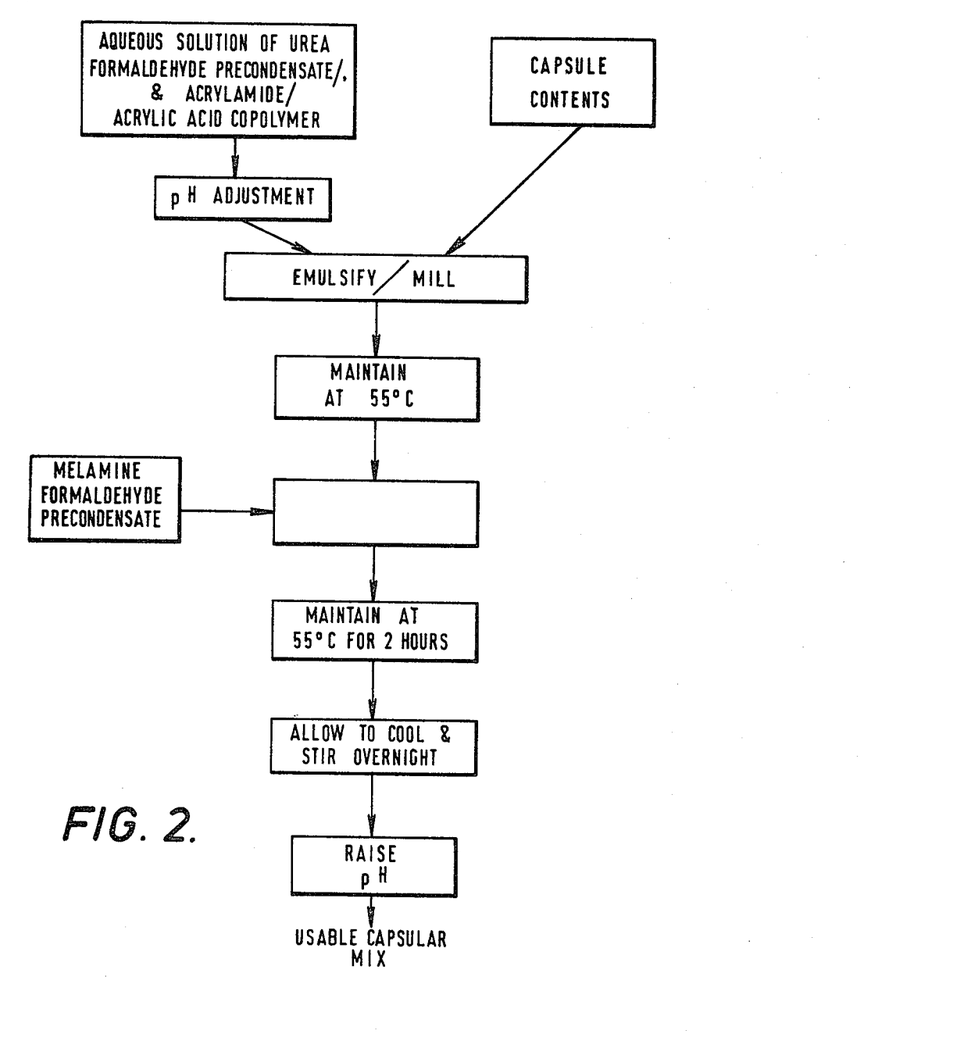
FIG. 2 depicts a process in which liquid to be encapsulated is added to an acidified solution of urea formaldehyde precondensate and acrylamide/acrylic acid copolymer.

Referring now to FIG. 2, an aqueous solution of urea formaldehyde precondensate and acrylamide/acrylic acid copolymer is prepared and its pH adjusted to about 4.4. Ater stirring for a short time, for example 5 minutes, material to be encapsulated is added, and the dispersion so obtained milled to a desired droplet size, for example 2-3 μm. The dispersion is then raised to a temperature of about 55° C and maintained at that temperature for a period of, for example, from half an hour to three hours. Melamine formaldehyde precondensate is then added, and the dispersion is maintained at 55° C for a further 2 hours. The dispersion is then allowed to cool and is left stirring overnight, after which usable capsules are found to be present. Finally, the pH of the dispersion was raised to about 8.5 with sodium hydroxide solution.

Figure 3:
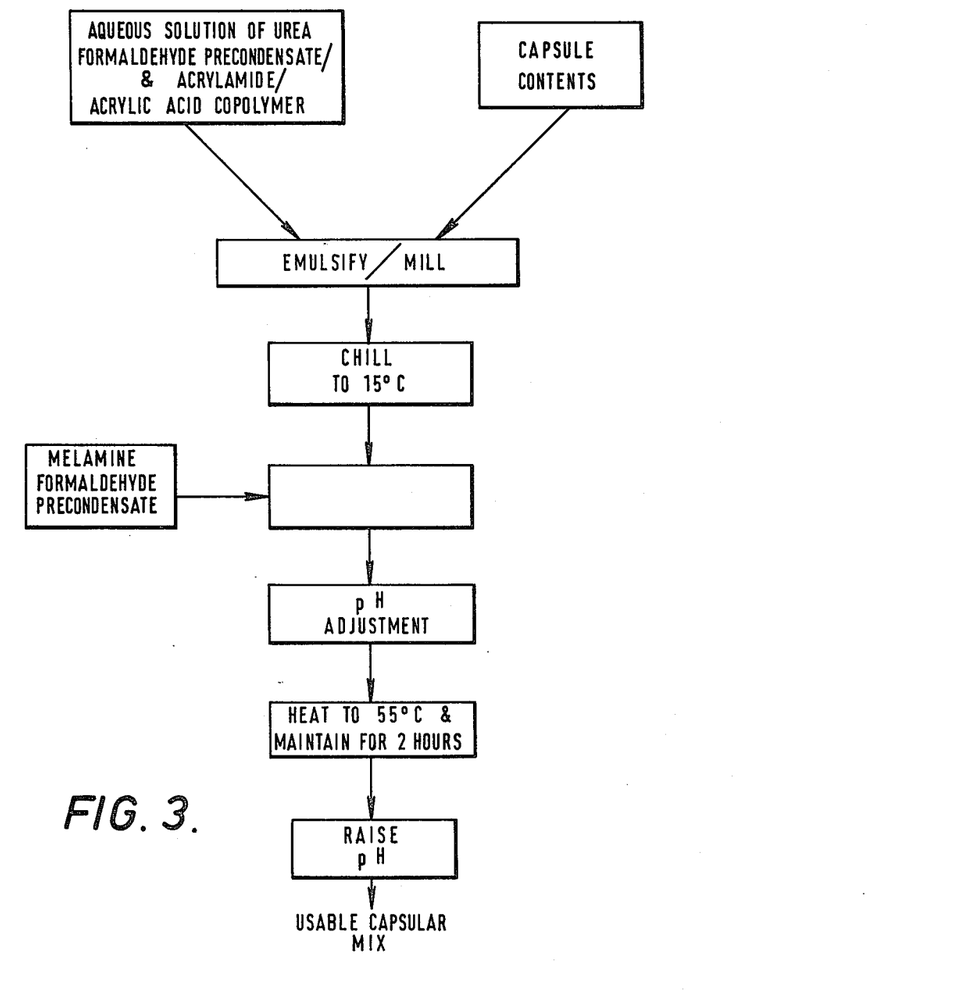
FIG. 3 depicts a process in which liquid to be encapsulated is added to an unacidified solution of urea formaldehyde precondensate and acrylamide/acrylic acid copolymer, and the resulting mixture is chilled before addition of melamine formaldehyde precondensate and subsequent acidification.

Referring now to FIG. 3, an aqueous solution of urea formaldehyde precondensate and acrylamide/acrylic acid copolymer is prepared. After stirring for a short time, for example five minutes, liquid to be encapsulated is added and the dispersion so obtained milled to a desired droplet size, for example 2 to 3 μm. The dispersion is then chilled to a temperature of about 15° C and melamine formaldehyde precondensate is then added. After adjusting the pH to about 4.2, the dispersion is heated to about 55° C and maintained at that temperature for about 2 hours. The pH of the dispersion is then raised to about 8.5 with sodium hydroxide solution, and the dispersion is then allowed to cool.

Although pH values of 4.7, 4.4 and 4.2 are referred to above, the same techniques can be used for pH values in the range 3.5 to 5.5.

In the event that formaldehyde fumes are evolved from the capsule dispersion as a result of formalin having been present in the precondensates, it may be quenched by the addition of an ammonium compound or other material which will consume the formaldehyde.

The present invention enables a stable dispersion of liquid to be encapsulated to be formed, without the need for continual agitation to prevent droplet coalescence. This facilitates accurate control of droplet size, and also permits the production of small capsules. Relatively cheap raw materials can be used in the process, and the process itself can be made relatively short compared with many previously used processes. The fact that the wall materials are synthetic means that they are not greatly susceptible to attack by micro-organisms, and the purity and chemical characteristics of the materials are not as critical as those used in coacervation systems for example. A further advantage of the present invention is that the capsules can be made stronger and less permeable than capsules resulting from coacervation systems. This means that it is possible to encapsulate highly polar materials which in general are difficult or impossible to encapsulate satisfactorily by means of coacervation systems. Examples of such highly polar materials are esters, e.g. phthalates. A further advantage of the present method is that the pH of the dispersion need not be less than about 4.0 which is not low enough to produce significant premature colour former development in the case of microcapsules for use in pressure-sensitive copying systems.

The material to be encapsulated may be any liquid or solid which can be dispersed in an aqueous medium and which is substantially inert to that medium. As previously stated, the present method is particularly suitable for the encapsulation of materials for use in pressure sensitive copying systems. These materials generally comprise a solution of one or more leuco dye derivative colour formers in an oily solvent. Examples of such solvents are partially hydrogenated terphenyls, chlorinated paraffins, biphenyl derivatives, alkyl naphthalenes, diaryl methane derivatives, and dibenzylbenzene derivatives. Examples of suitable leuco dye derivative colour formers are phthalide derivatives e.g. crystal violet lactone, fluoran derivatives, diphenylamine derivatives, spiropyrane derivatives and phthalimidine derivatives. Such solvents and colour formers are well known in the pressure-sensitive copying paper art, and so will not be described further herein.

The invention will now be illustrated by the following examples:

EXAMPLE I

The following were first mixed:

(a) 95 g of BC 77 cationic urea-formaldehyde precondensate having a reactive resin content of approximately 45% and a solids content of approximately 35% (BC 77 is supplied by British Industrial Plastics Limited);

(b) 60 g of BC 336 methylated melamine formaldehyde precondensate having a reactive resin content of about 76% and a solids content of approximately 71% (BC 336 is supplied by British Industrial Plastics Limited);

(c) 240 g of R1144 copolymer (a 20% solution of an acrylamide/acrylic acid copolymer supplied by Allied Colloids Limited and having a viscosity average molecular weight of 400,000 and an acrylic acid content of 42%); and (d) 850 g de-ionized water.

200 g of de-ionized water were then added to 800 g of the mixture described above, and the mixture was milled with 800 g of material to be encapsulated until a mean droplet size of 2 to 3 μm was reached.

The material to be encapsulated, which will hereafter be referred to as "internal phase" was a colour former solution. The solvent for the colour former solution was a 4:1 w/w mixture of kerosene and HB40, the latter being a mixture of partially hydrogenated terphenyls sold by Monsanto Limited (HB40 is also known as Santasol 340). The colour formers were crystal violet lactone and benzoyl leucomethylene blue, present in amounts of 1.7% w/w and 1.4% w/w respectively.

The remainder of the mixture was then added, followed by 1405 g of de-ionized water as a diluent. The resulting composition was stirred for 30 minutes, after which its pH was lowered to 4.7 by adding acetic acid.

Stirring was then carried out for a further 30 minutes. The temperature was then raised to 55° C using a water bath and the mixture stirred for 2 hours at that temperature, after which the composition was allowed to cool and left stirring overnight. Next morning capsules were seen to have formed, and the pH was raised to 10.0. The capsules obtained were subsequently coated onto paper using a laboratory Meyer bar coater. When the sheet was placed on a colour-developing sheet and written upon, a clear blue copy was developed on the colour-developing sheet.

EXAMPLE II

This Example illustrates the use of polymers other than the acrylamide/acrylic acid copolymer used in Example I, and also the use of a cationically modified acrylamide copolymer.

The following were first mixed:
(a) 105 g of BC 77 cationic urea formaldehyde precondensate;
(b) 50 g of BC 336 methylated melamine formaldehyde precondensate; and
(c) 650 g of de-ionized water.

The above mixture, which had a pH of 7.8, was then emulsified with 800 ml of the internal phase used in Example I and the emulsion obtained was diluted with 1605 g de-ionized water. It was necessary to agitate the mixture vigorously to prevent the emulsion from destabilizing.

The pH was then raised to 8.7 by adding sodium hydroxide solution, with the result that internal phase clusters of mean diameter 10 to 15 $\mu$m were formed.

The emulsion was then divided into five parts, and an addition was made to each part as follows:
Part (i) nothing;
Part (ii) 50 g of 20% solution of a cationically modified acrylamide copolymer (R1148 supplied by Allied Colloids Limited as a 20% solution);
Part (iii) 50 g of a 20% solution of R1144 copolymer (as a control);
Part (iv) 200 g 5% polyvinylmethyl ether/maleic anhydride copolymer (PVM/MA).
Part (v) 200 g of 5% sodium carboxymethyl cellulose solution (B10, supplied by I.C.I. Limited)

Each mixture was then stirred for one hour at ambient temperature, after which the pH was lowered to 4.5 by adding acetic acid, followed by further stirring for 1 hour. The temperature of each mix was then raised to 55° C and maintained at that temperature for 1½ hours with stirring. The mix was then coated onto paper as described in Example I.

Mix (i) gave an oily sheet, indicating that capsules had not been formed. The remaining sheets appeared satisfactory, and when superimposed on a colour-developing sheet and written upon, a clear blue copy was developed on the colour-developing sheet.

EXAMPLE III

This illustrates the use of different relative proportions of the precondensates and the polymer while maintaining the total weight of precondensates and polymer constant.

The encapsulation procedure in each case was as described in Example I, except that the pH of the mixture was first adjusted to 8.7, and subsequently lowered to 4.5 instead of 4.7. The quantities of material used are shown below:

| Wt. of BC 77 (dry) (g) | Wt. of BC 336 (dry) (g) | Wt. of R1144 (dry) (g) |
|---|---|---|
| 47 | 38 | 50 |
| 28.5 | 46 | 60.5 |
| 60 | 32.5 | 42.5 |
| 55 | 22 | 58 |
| 41 | 50 | 44 |
| 57.5 | 46.5 | 31 |
| 39.5 | 32 | 63.5 |

The resulting mixes were each coated on to paper as described in Example I. When each of the coated sheets was superimposed on a colour developing sheet and written upon, a clear blue copy was developed on the colour developing sheet.

EXAMPLE IV

Example I was repeated except that different reaction pH values were employed, namely 5.5, 5.0, 4.5, 4.0, 3.5, 5.2, 5.0, 4.8, 4.6, and 4.4. The resulting mixes were each coated on to paper as described in Example I. When each of the coated sheets was superimposed on a colour developing sheet and written upon, a clear blue copy was developed on the colour developing sheet.

EXAMPLE V

Example I was repeated except that in place of R1144 copolymer the same quantity of each of the following polymers were used:-
(a) Cationic Starch (Krystal Kote sold by Laing National Ltd.)
(b) Dispex N40 (a polyacrylate containing polymer sold by Allied Colloids Ltd.)
(c) Coating starch
(d) Methyl hydroxypropyl cellulose (Methofas PM sold by ICI Ltd.)
(e) Versicol X13 (a non-ionic polyelectrolyte sold by Allied Colloids Ltd.)

The resulting mixes were each coated on to paper as described in Example I. When each of the coated sheets was superimposed on a colour developing sheet and written upon, a clear blue copy was developed on the colour developing sheet.

EXAMPLE VI

This illustrates the fact that addition of methylated melamine formaldehyde precondensate can take place after formation of a dispersion of internal phase.

The following were first mixed:
(a) 19 g of BC 77 cationic urea formaldehyde precondensate.
(b) 42 g of R1144 copolymer.
(c) 180 g of de-ionized water.

154 g of internal phase were added and the pH was lowered to 4.4. After 5 minutes stirring the mixture was milled to give a mean droplet size of 4 $\mu$m. The dispersion was then divided into five parts, and 12 g of BC 336 methylated melamine formaldehyde resin were added to each part as follows:
Part 1 — immediately
Part 2 — after heating at 55° C (water bath) for ½ hour
Part 3 — after heating at 55° C (water bath) for 1 hour
Part 4 — after heating at 55° C (water bath) for 2 hours
Part 5 — after heating at 55° C (water bath) for 3 hours Each part was then maintained at 55° C, for a further two hours, and then left up to cool overnight, with stirring. Next morning, the pH was raised to 8.5 with sodium hydroxide solution.

The mixes were then diluted to 40% solids content and coated onto paper using a laboratory Meyer bar coater. The viscosity and solids contents of the mixes before dilution are shown below:

| Part No | Solids Content (before dilution) % | Viscosity cp* |
|---|---|---|
| 1 | 47 | 476 |
| 2 | 41 | 842 |
| 3 | 43 | 572 |
| 4 | 49 | 540 |
| 5 | 45 | 616 |

*As measured using a Brookfield Viscometer, Model RVT, Spindle 2 at 10 rpm.

The viscosity was low compared with that which is observed for conventional gelatin-based capsular mixes of comparable solids content.

When each of the coated sheets was superimposed on a colour developing sheet and written upon, a clear blue image was developed on the colour developing sheet.

EXAMPLE VII

This illustrates a technique for swiftly achieving a stable dispersion of a droplet size of approximately 4 $\mu$m or lower.

The following were first mixed:
(a) 19 g of BC 77 cationic urea formaldehyde precondensate.
(b) 42 g of R1144 copolymer.
(c) 180 g of de-ionized water.

This mixture was heated for ½ hour with constant stirring at a temperature of 55° C, after which was added:
(d) 12 g of BC336 methylated melamine formaldehyde precondensate.

The pH of this mixture was reduced to 4.4 by addition of 14.7% acetic acid solution and stirred for a further 5 minutes after which were added:
(e) 154 g of internal phase.

The resulting mixture was milled until a droplet size of 4 $\mu$m was achieved (the milling time by this method was reduced from 2 minutes as in Example VI to 10 seconds). After milling, the temperature of the dispersion was reduced to 35° C and stirred at constant temperature for 1 hour, after which the temperature was raised to 55° C and held for 2 hours. Maintaining the constant stirring, the capsule dispersion which had formed was allowed to cool overnight and the pH adjusted to be in the range from 8.0 to 10.0.

If desired, extra methylated melamine formaldehyde precondensate may be added after the internal phase has been dispersed and the temperature dropped to 35° C. This gives the advantage of producing tougher capsules but at a cost of necessitating the addition of extra dilution water and hence a lowering in solids content and phase ratio.

The above procedure was then repeated using different phase ratios, namely 5.9:1, 4.8:1 and 2.6:1. The 5.9:1 phase ratio mix (43% solids content) was produced as described above without the final addition of extra precondensate and dilution water. The 4.8:1 and 2.6:1 phase ratio mixes (40% and 25% solids content respectively), were produced by a final addition of 8.0 g and 44.0 g respectively of precondensate and of 30 g and 420 g deionized water respectively.

All four mixes were then coated on to paper as described in Example I. When each of the resulting sheets was superimposed on a colour developing sheet and written upon, a clear blue copy was developed on the colour developing sheet.

EXAMPLE VIII

This illustrates the production of capsules by a continuous process rather than by the batch processes so far described. The process will be described with reference to FIG. 4 which is a diagrammatic side view of a continuous encapsulation apparatus. A dispersion of internal phase was prepared in an aqueous solution of the wall materials as described in Example I, and after pH adjustment, was fed into a hopper A. This was then allowed to drip at a constant rate into a first tank B which was heated by a water jacket C to a constant temperature of 55° C. An overflow pipe P was provided in the tank B, so that when the level of dispersion reached the pipe P, it flowed out into a second tank D also heated by a water jacket E which maintained the dispersion at 55° C. An overflow pipe Q was provided in the tank D, for similarly conveying the dispersion to a third tank F, heated to 55° C by a water jacket G. An overflow pipe R was provided in the tank F, for conveying dispersions to a receiving vessel H. Capsules were found to be present in vessel H, and the pH was adjusted to 10.0 with sodium hydroxide and the capsular mix stored. Once all three tanks were full, the throughout was adjusted so that the dispersion took on average 2 hours to go through the system. By continually topping up tank A capsules were produced for a period of 3 hours after stability had been attained.

Figure 4:
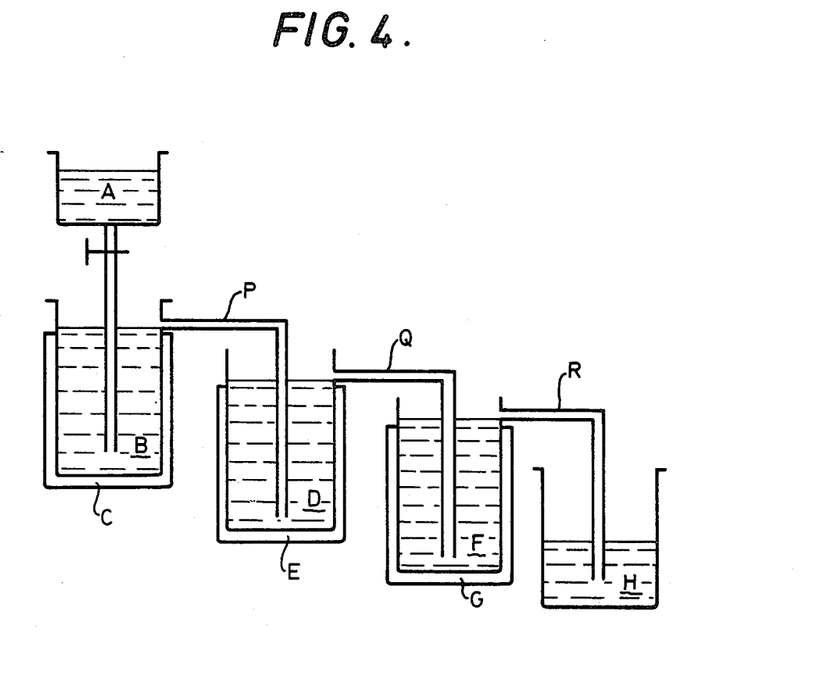

Samples were withdrawn one, two and three hours after the system had reached an equilibrium state, and were coated on to paper as described in Example I. When each of the resulting sheets was superimposed on a colour developing sheet and written upon a clear blue copy was developed on the colour developing sheet.

EXAMPLE IX

This illustrates an encapsulation procedure in which a chilling step is carried out before addition of melamine formaldehyde precondensate.

84 g of R1144 copolymer was dissolved in 400 g of de-ionized water, and the solution was heated to 55° C. 38 g of BC 77 cationic urea-formaldehyde precondensate were added, and the mixture was stirred for 40 minutes at 55° C. The mixture was then milled with 189 g of internal phase, as described in Example I.

The resulting emulsion was chilled to 15° C, and 45 g of BC 336 melamine formaldehyde precondensate were added. The pH was then lowered to 4.15 by addition of 14.7% acetic acid, and the emulsion was allowed to stand for one hour with stirring. The temperature was then raised to 55° C, and stirring was continued at this temperature for 2 hours. The emulsion was then allowed to cool to ambient temperature, after which the pH was raised to 10 with sodium hydroxide solution.

The capsules obtained were coated on to paper as described in Example I. When the resulting coated sheet was superimposed on a colour developing sheet and written upon, a clear blue image was developed on the colour developing sheet.

The chilling step mentioned above helps to prevent droplet coalescence and formation of undesirably large capsules, which may lead to formation of blue spots when in use in a pressure-sensitive copying system. It is preferred to chill to a temperature in the range 15° to 30° C, about 15° C being preferred.

EXAMPLE X 84 g of R1144 acrylic acid/acrylamide copolymer were dissolved in 550 g of de-ionized water. 38 g of BC 77 cationic urea-formaldehyde precondensate were added and the mixture stirred for 5 minutes. The mixture was then milled with 189 g of internal phase as described in Example I to a droplet size of 4 μm.

The resulting emulsion was chilled to 15° C and split into two equal parts. To one half were added 40 g of BC 355, a methylated melamine formaldehyde precondensate having a reactive resin content of 76%, and to the other half were added 34 g of BC 309, a methylated melamine formaldehyde precondensate having a reactive resin content of 90% (both BC 355 and BC 309 are supplied by British Industrial Plastics Limited).

Both emulsions were lowered in pH to 4.15 by addition of 14.7% acetic acid and held for 1 hour before heating to 55° C. This temperature was maintained for 2 hours after which the pH was raised to 8.5 with 25% caustic soda.

Each batch of capsules obtained was coated on to paper as described in Example I. When each of the resulting coated sheets were superimposed on a colour-developing sheet and written upon, a clear blue copy was developed on the colour developing sheet.

EXAMPLE XI 42 g of R1144 acrylic acid/acrylamide copolymer were dissolved in 275 g of de-ionized water. 19 g of BC 55, a cationic urea-formaldehyde precondensate having a reactive resin content of 45% were added and the mixture stirred for 5 minutes (BC 55 is supplied by British Industrial Plastics Limited). The mixture was then milled with 189 g of internal phase as described in Example I to a droplet size of 4 μm.

The resulting emulsion was chilled to 15° C and 40 g of BC 336 methylated melamine formaldehyde precondensate were added. The pH was dropped to 4.15 by the addition of 14.7% acetic acid. After holding for 1 hour it was heated to 55° C and maintained at that temperature for 2 hours. The pH was raised to 8.5 with 25% caustic soda.

The capsule mix so obtained was coated on to paper as described in Example I. When the resulting coated paper was superimposed on a colour developing sheet and written upon, a clear blue copy was developed on the colour developing sheet.

EXAMPLE XII

This example illustrates the use of further water soluble polymers.

(a) 84 g of a 10% gelatin solution were mixed with 233 g of deionized water and the solution maintained at 40° C. 19 g of BC 77 cationic urea formaldehyde precondensate were added and the mixture stirred for 5 minutes. It was then milled with 189 g of internal phase as described in Example I to a droplet size of 8 μm. 40 g of BC 336 methylated melamine formaldehyde precondensate were added and the pH was dropped to 4.15 with 14.7% acetic acid. After heating for 2 hours at 55° C, the pH was raised to 8.5 with 25% caustic soda after which usable capsules had been produced.

(b) 8.4 g of a polyethylene/maleic anhydride copolymer was mixed with 160 g of de-ionized water and heated to 90° C (the copolymer used was EMA 31 supplied by Monsanto Ltd). After chilling to 20° C the solution was mixed with 250 g of de-ionized water and 19 g of BC 77 cationic urea formaldehyde precondensate. After 5 minutes stirring this mixture was milled with 189 g of internal phase as described in Example I to a droplet size of 4 μm 40 g of BC 336 methylated melamine formaldehyde precondensate was added and the pH dropped to 4.15 with 14.7% acetic acid. After heating at 55° C for 2 hours, the pH was raised to 8.5 with 25% caustic soda after which usable capsules had been produced. The capsule mixes from a) and b) were each coated on to paper as described in Example I. When the resulting coated papers were superimposed on colour-developing sheets and written upon, a clear blue copy was developed in each case on the colour developing sheet.

EXAMPLE XIII

This Example demonstrates the encapsulation of a phosphate ester, which is a higher polar liquid and which is difficult or impossible to encapsulate by conventional coacervation techniques using hydrophilic colloids such as gelatin.

42 g of R1144 acrylic acid/acrylamide copolymer were dissovled in 170 g of de-ionized water and heated to 50° C. 19 g of BC 77 cationic urea formaldehyde precondensate were added and the temperature maintained at 50° C for 40 minutes. 105 g cold deionized water were stirred in and the mixture milled with 189 g of internal phase to a droplet size of 4 μm. The internal phase consisted of colour formers as detailed in Example I dissolved in a 1:1 mixture of kerosene and phosphate ester.

The resulting emulsion was chilled to 15° C and 40 g of BC 336 methylated melamine formaldehyde precondensate were added. The pH was dropped to 4.15 by the addition of 14.7 % acetic acid. After holding for 1 hour the mixture was heated to 55° C and maintained at that temperature for 2 hours. The pH was raised to 8.5 with 25% caustic soda and usable capsules were obtained. The capsules were coated on to paper as described in Example I. When the coated sheet was superimposed on a colour developing sheet and written upon, a clear blue copy was developed on the colour developing sheet.

We claim:

1. A method of encapsulating a finely divided material to produce microcapsules in which the material is surrounded by polymeric shells, comprising the steps of
    (a) providing a dispersion of said material in an aqueous medium containing a water soluble urea-formaldehyde precondensate, a water soluble melamine-formaldehyde precondensate, and a water-soluble polymer which is capable of being cross-linked by said precondensates; and
    (b) condensing said precondensates by acid catalysis with an acid to achieve cross-linking of said polymer about said material, thereby to form said polymeric shells.

2. The method of claim 1 wherein the water soluble polymer contains alcohol, amine, amide, acid, or acid derivative groups.

3. The method of claim 1 wherein the water soluble polymer is selected from the group consisting of polyacids, polyesters, polyacrylamides, co-polymers of polyanhydrides, co-polymers of polyacrylamides, starch, starch derivatives, cellulose derivatives, gelatin and mixtures thereof.

4. The method of claim 1 wherein said water soluble polyer is an acrylamide/acrylic acid co-polymer.

5. The method of claim 1 wherein the water soluble polymeric is ionic.

6. The method of claim 5 wherein the water soluble polymer is anionic.

7. The method of claim 1 wherein said urea-formaldehyde precondensate is cationic.

8. The method of claim 1 wherein said melamine formaldehyde precondensate is a methylated melamine formaldehyde precondensate.

9. The method of claim 1 wherein the material to be encapsulated comprises minute droplets of a water-immiscible liquid and said water soluble polymer is dispersion stabilizing on its own.

10. The method of claim 9 wherein the water soluble polymer is dispersion stabilizing in the presence of at least one of said precondensates.

11. The method of claim 1 wherein said urea-formaldehyde precondensate, said melamine formaldehyde precondensate and said water-soluble polymer are all present in said aqueous medium before addition of the finely divided material to be encapsulated to form said dispersion, and wherein the acid catalyst utilized to achieve condensation of the precondensate is added after formation of said dispersion.

12. The method of claim 1 wherein only said urea-formaldehyde precondensate and said water soluble polymer are present in said aqueous medium before addition of the finely divided material to be encapsulated, and wherein said melamine formaldehyde precondensate is added subsequently to said material to form said dispersion.

13. The method of claim 12, wherein said melamine formaldehyde precondensate is added in batches to control the droplet size of the microcapsules.

14. The method of claim 12, wherein the acid catalyst utilized to achieve condensation of said precondensates is added to said aqueous medium before addition of melamine formaldehyde precondensate.

15. The method of claim 12, wherein said aqueous medium is chilled to a temperature below 30° C after addition of the material to be encapsulated and before addition of melamine formaldehyde precondensate.

16. The method of claim 12 wherein the acid catalyst utilized to achieve condensation of said precondensates is added to said aqueous medium before addition of melamine formaldehyde precondensate.

17. The method of claim 1 wherein the dispersion is heated to a temperature of about 55° to about 85° C after addition of the material to be encapsulated and before addition of melamine formaldehyde precondensate.

18. The method of claim 1 wherein the aqueous medium is made alkaline after microcapsule formation.

19. A sheet material carrying microcapsules prepared in accordance with claim 18.

20. Microcapsules prepared in accordance with the method of claim 1.

21. A method of encapsulating a finely divided material to produce microcapsules for use in a pressure sensitive copying system in which the material is surrounded by polymeric shells comprising the steps consisting essentially of:
   (a) providing a dispersion of said material in an aqueous medium containing a water soluble ureaformaldehyde precondensate, a water soluble melamine-formaldehyde precondensate, and a water soluble polymer which is capable of being cross-linked by said precondensate and which contains at least one functional group selected from the group consisting of alcohol, amine, acid, acid derivative groups, and mixtures thereof; and
   (b) condensing said precondensate by acid catalysis with an acid in a manner sufficient to obtain cross-linking of said water soluble polymer about said material to form said polymeric shells.

22. The method of claim 21 wherein the water soluble polymer is selected from the group consisting of polyacids, polyesters, polyacrylamides, co-polymers of polyanhydrides, co-polymers of polyacrylamides, starch, starch derivatives, cellulose derivatives gelatin and mixtures thereof.

23. The method of claim 21 wherein said water soluble polymer is an acrylamide/acrylic acid co-polymer.

* * * * *